(12) United States Patent
Tantiwuttipong et al.

(10) Patent No.: US 10,846,490 B1
(45) Date of Patent: Nov. 24, 2020

(54) ELECTRONIC CARD READER TESTING SYSTEM

(71) Applicant: Taco Bell Corp., Irvine, CA (US)

(72) Inventors: Prad Tantiwuttipong, Irvine, CA (US); Charles Davis, Vista, CA (US); Dennis Fischer, San Diego, CA (US)

(73) Assignee: Taco Bell Corp., Irvine, CA (US)

( * ) Notice: Subject to any disclaimer, the term of this patent is extended or adjusted under 35 U.S.C. 154(b) by 0 days.

(21) Appl. No.: 16/549,021

(22) Filed: Aug. 23, 2019

Related U.S. Application Data

(60) Provisional application No. 62/871,449, filed on Jul. 8, 2019.

(51) Int. Cl.
*G06K 7/10* (2006.01)
*G06K 7/00* (2006.01)
*G06Q 20/20* (2012.01)

(52) U.S. Cl.
CPC ......... *G06K 7/0095* (2013.01); *G06K 7/0004* (2013.01); *G06Q 20/204* (2013.01)

(58) Field of Classification Search
CPC . G06K 7/0095; G06K 7/10851; G06K 7/0013
USPC ........................................................ 235/438
See application file for complete search history.

(56) References Cited

U.S. PATENT DOCUMENTS

| | | | |
|---|---|---|---|
| 6,516,357 B1 * | 2/2003 | Hamann | G06Q 20/3552 709/229 |
| 7,438,222 B2 | 10/2008 | Green et al. | |
| 10,515,519 B2 * | 12/2019 | Johnson | G07G 1/0009 |
| 2018/0144336 A1 * | 5/2018 | Fenton | G06Q 20/341 |
| 2018/0181960 A1 * | 6/2018 | Fenton | G06Q 20/4093 |
| 2018/0253572 A1 * | 9/2018 | Ryan | G06K 7/0095 |
| 2019/0329413 A1 * | 10/2019 | Johnson | B25J 9/1697 |

* cited by examiner

*Primary Examiner* — Ahshik Kim
(74) *Attorney, Agent, or Firm* — Stites & Harbison, PLLC; David W. Nagle, Jr.

(57) ABSTRACT

An electronic card reader testing system includes a robot assembly that is used to manipulate one or more credit cards, debit cards, gift cards, or similar electronic cards, and selectively swipe one of the electronic cards through a first slot of the electronic card reader and/or selectively insert (or "dip") one of the electronic cards into the second slot of the electronic card reader. Operation of the robot assembly is managed by a control system. The testing system may also include a computer program that operably connects the control system of the robot assembly to a point-of-sale (POS) system, thus further automating the testing protocol.

9 Claims, 8 Drawing Sheets

ELECTRONIC CARD READER TESTING SYSTEM

CROSS-REFERENCE TO RELATED APPLICATIONS

The present application claims priority to U.S. Patent Application Ser. No. 62/871,449 filed on Jul. 8, 2019, the entire disclosure of which is incorporated herein by reference.

BACKGROUND OF THE INVENTION

In retail transactions, point-of-sale (POS) systems are used by a merchant to process and complete a transaction. Almost all such POS systems include an electronic card reader that can be used to read the encoded information on a credit card, debit card, gift card, or similar electronic card. Such electronic card readers are well-known in the art, and current electronic card readers are commonly configured to both (i) read encoded information on a magnetic strip on the card when it is swiped through a first slot of the electronic card reader, and (ii) read encoded information from electronic integrated circuits (or "chips") that are embedded in the card, typically by inserting (or "dipping") the card into a second slot of the electronic card reader.

When setting up a POS system for use by a merchant, it is necessary to test the system to confirm that one or both of the modes for reading information from the credit card, debit card, gift card, or similar electronic card are functioning properly. Manually testing electronic card readers of the POS system requires many man-hours and is an extremely repetitive process, as multiple cards from different vendors with different payment amounts much be tested.

Thus, there is a need for an improved system for testing electronic card readers.

SUMMARY OF THE INVENTION

The present invention is an electronic card reader testing system.

An exemplary electronic card reader testing system made in accordance with the present invention includes a robot assembly that is used to manipulate one or more credit cards, debit cards, gift cards, or similar electronic cards, and selectively swipe one of the electronic cards through a first slot of the electronic card reader and/or selectively insert (or "dip") one of the electronic cards into the second slot of the electronic card reader. Operation of the robot assembly is managed by a control system.

An exemplary robot assembly includes a first servomotor that is operably connected to a drive wheel. A first arm is then connected to and extends from the drive wheel. A first hinge at the distal end of the first arm then connects the first arm to a second arm. In this regard, a proximal end of the second arm is connected to the distal end of the first arm at the first hinge. A second hinge at the distal end of the second arm then connects the second arm to a sliding member. The sliding member is configured for lateral (or sliding) movement relative to a rail. An upright support member is mounted on the sliding member. The robot assembly then includes a second servomotor that is mounted to the top of the upright support member. The second servomotor is operably connected to and rotates a disc. Mounts are secured to a face of the disc, and each of these mounts is configured to grasp or otherwise hold and secure an electronic card.

As a result of the above-described construction of the robot assembly, one or more of the electronic cards that are secured by the mounts to the face of the disc can be selectively advanced to engage an electronic card reader, inserting (or "dipping") a selected one of the electronic cards into a slot of the electronic card reader. Furthermore, one or more of the electronic cards that are secured by the mounts to the face of the disc can also be selectively advanced to engage the electronic card reader, inserting a selected one of the electronic cards into another slot of the electronic card reader and replicating a swiping motion.

In some embodiments, the testing system may also include a computer program that operably connects the control system of the robot assembly to a point-of-sale (POS) system, thus further automating the testing protocol.

DETAILED DESCRIPTION OF THE INVENTION

The present invention is an electronic card reader testing system.

Figure 1:
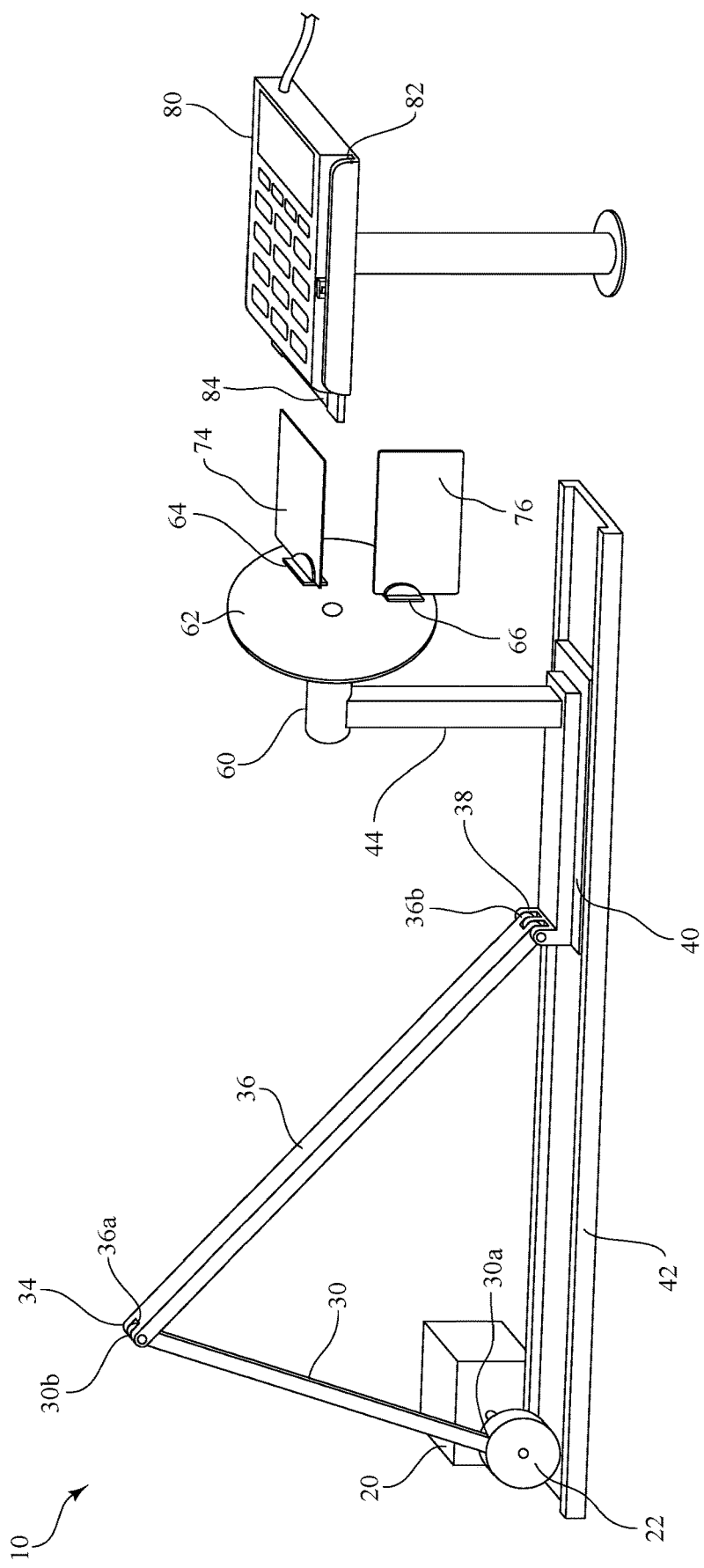
FIG. 1 is a perspective view of an exemplary electronic card reader testing system made in accordance with the present invention, including a robot assembly.

Referring now to FIG. 1, an exemplary electronic card reader testing system made in accordance with the present invention includes a robot assembly 10 that is used to manipulate one or more credit cards, debit cards, git cards, or similar electronic cards, and selectively swipe one of the electronic cards through a first slot of the electronic card reader and/or selectively insert (or "dip") one of the electronic cards into the second slot of the electronic card reader. As further described below, operation of the robot assembly 10 is managed by a control system 100; see FIG. 2.

Referring still to FIG. 1, an exemplary robot assembly 10 includes a first servomotor (or "arm servo") 20 that is operably connected to a drive wheel 22. Specifically, the rotation of the drive wheel 22 by the first servomotor 20 is controlled by the control system 100, as further described below. A first arm 30 is then connected to and extends from the drive wheel 22. In this regard, a proximal end 30a of the first arm 30 is connected to the drive wheel 22. A first hinge 34 (which, in this exemplary embodiment, is created by a pin connection) at the distal end 30b of the first arm 30 then connects the first arm 30 to a second arm 36 in this regard, a proximal end 36a of the second arm 36 is connected to the distal end 30b of the first arm 30 at the first hinge 34. A second hinge 38 at the distal end 36b of the second arm 36 then connects the second arm 36 to a sliding member 40.

Referring still to FIG. 1, the sliding member 40 is configured for lateral (or sliding) movement relative to a rail 42, with the movement facilitated by ball bearings or rollers (not shown). Such an arrangement of a sliding member 40 and a rail 42 is well-known and common in the construction of slides that are used, for example, to open and close drawers; many commercially available slides could thus be used and incorporated into the robot assembly 10 to achieve the desired movement.

Referring still to FIG. 1, in this exemplary embodiment, an upright support member 44 is mounted on the sliding member 40. The robot assembly 10 then includes a second servomotor (or "wheel servo") 60 that is mounted to the top of the upright support member 44. The second servomotor 60 is operably connected to and rotates a disc 62. Specifically, the rotation of the disc 62 by the second servomotor 60 is also controlled by the control system 100, as further described below.

In the exemplary embodiment illustrated in FIG. 1, there are two mounts 64, 66 which are each secured to a face of the disc 62, and each of these mounts 64, 66 is configured to grasp or otherwise hold and secure an electronic card 74, 76. For example, as shown in FIG. 1, each of the two mounts 64, 66 may be comprised of two panels separated by a small gap, such that an electronic card 74, 76 can be held and secured in the small gap.

As a result of the above-described construction of the robot assembly 10, each of the electronic cards 74, 76 can be selectively advanced to engage an electronic card reader 80, inserting (or "dipping") a selected one of the electronic cards 74, 76 into the second slot 84 of the electronic card reader 80, as further described below.

Figure 2:
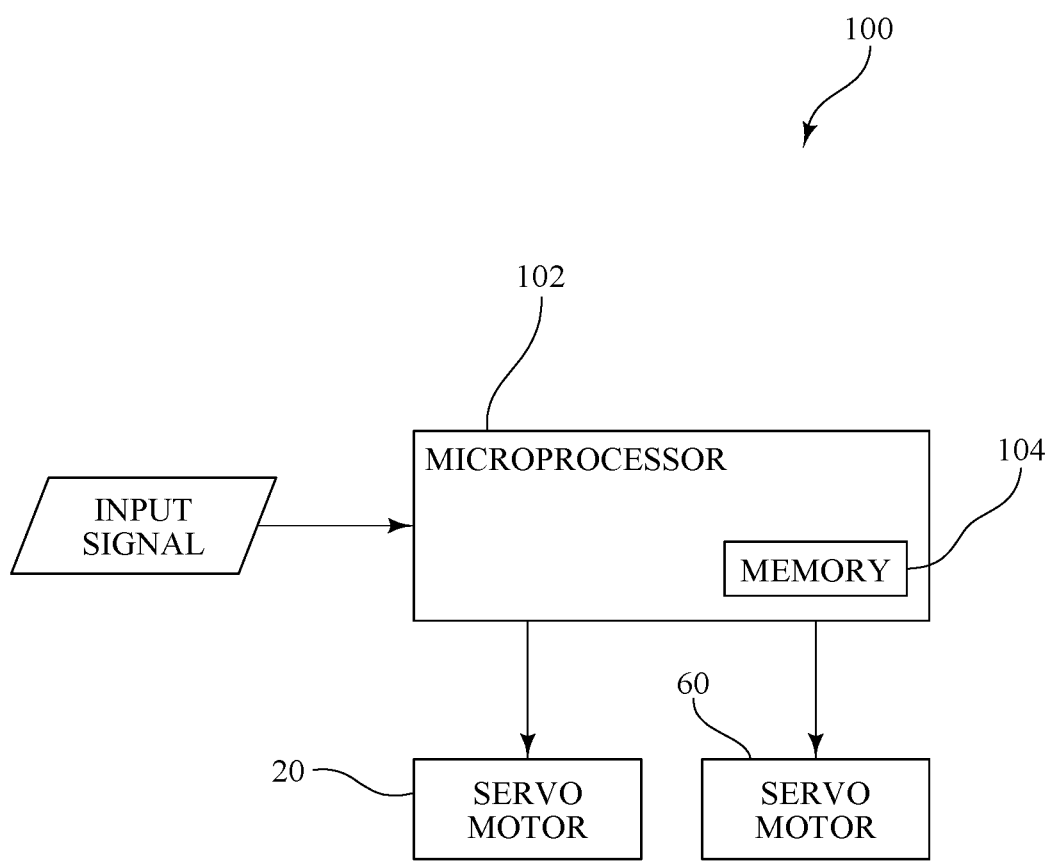
FIG. 2 is a schematic diagram of a control system for the robot assembly 10 of the exemplary electronic card reader testing system of FIG. 1.

FIG. 2 is a schematic diagram of a control system 100 for the above-described robot assembly 10 as part of an exemplary electronic card reader testing system made in accordance with the present invention. As shown, such a control system 100 includes a microprocessor 102 with a memory component 104. The microprocessor 102 receives an input signal indicative of which of the electronic cards is to be advanced to engage the electronic card reader 80. Each of the first servomotor 20 and the second servomotor 60 is operably connected to and receives control signals from the microprocessor 102. Accordingly, each of the first servomotor 20 and the second servomotor 60 can be operated in response to the input signal.

Figure 3:
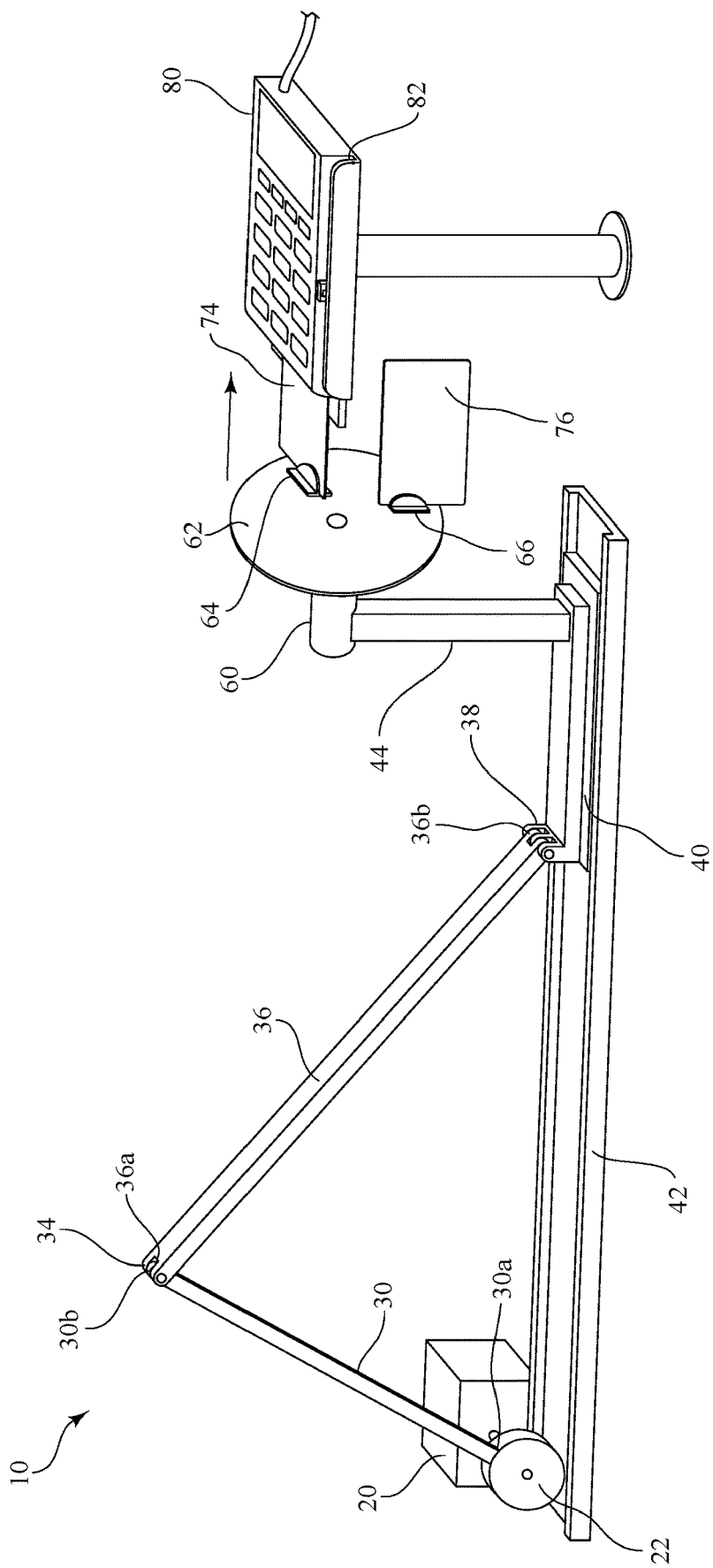
FIG. 3 is a perspective view similar to FIG. 1, illustrating the movement of the robot assembly to insert (or dip) an electronic card into a slot of an electronic card reader.

Referring again to FIGS. 1 and 2, in use, upon receipt of an input signal, the microprocessor 102 of the control system 100 communicates a control signal to the second servomotor 60, which rotates the disc 62, such that a selected electronic card 74 is aligned with the second slot 84 of the electronic card reader 80. The control system 100 then communicates a control signal to the first servomotor 20, rotating the drive wheel 22. Such rotation of the drive wheel 22 (clockwise in FIG. 1) causes the first arm 30 to rotate, which causes the distal end 30b of the first arm 30 and the first hinge 34 to move downward. Thus, the proximal end 36a of the second arm 36 (and the first hinge 34) also moves downward, which advances the distal end 36b of the second arm 36 (along with the sliding member 40, upright support member 44, second servomotor 60, and disc 62) forward and toward the electronic card reader 80 in a first direction. Such forward movement is facilitated by the sliding movement of the sliding member 40 relative to the rail 42, and it results in the insertion of the electronic card 74 into the second slot 84 of the electronic card reader 80, as shown in FIG. 3. Of course, activating the first servomotor 20 to rotate the drive wheel 22 in the opposite direction would move the distal end 36b of the second arm 36 (along with the sliding member 40, upright support member 44, second servomotor 60, and disc 62) away from the electronic card reader 80 in a second direction, withdrawing the electronic card 74 from the second slot 84 of the electronic card reader.

Figure 4:
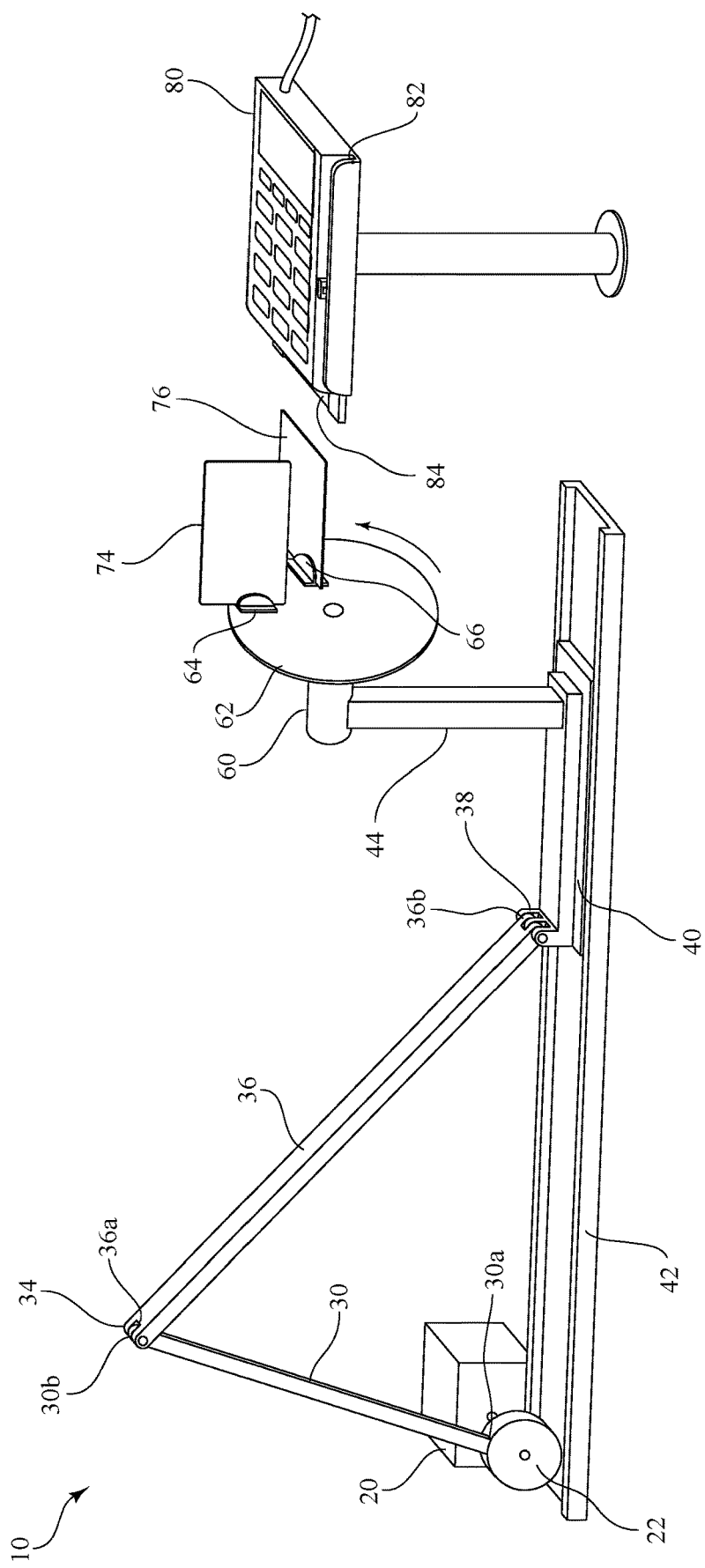
FIGS. 4 and 5 are perspective views similar to FIG. 3, illustrating the movement of the robot assembly to insert (or dip) another electronic card into the slot of the electronic card reader.
Figure 5:
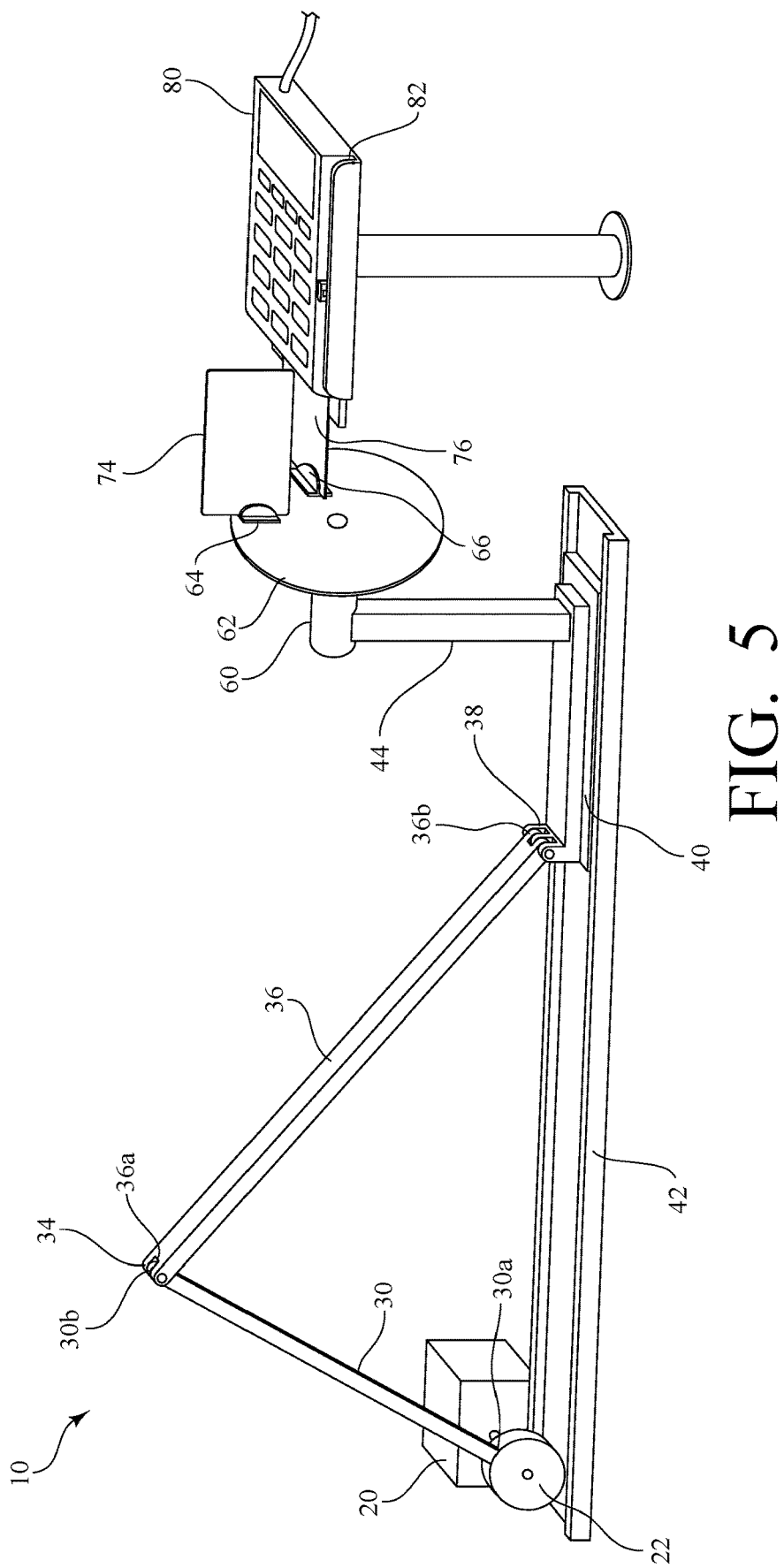

FIG. 4 is substantially identical to FIG. 1, except that, in response to a control signal from the control system 100 (FIG. 2), the disc 62 has been rotated counterclockwise approximately 90°, such that the electronic card 76 is now aligned with the second slot 84 of the electronic card reader 80. Once so aligned, the control system 100 then communicates a control signal to the first servomotor 20, rotating the drive wheel 22. Such rotation of the drive wheel 22 (clockwise in FIG. 4) causes the first arm 30 to rotate, which causes the distal end 30b of the first arm 30 and the first hinge 34 to move downward. Thus, the proximal end 36a of the second arm 36 (and the first hinge 34) also moves downward, which advances the distal end 36b of the second arm 36 (along with the sliding member 40, upright support member 44, second servomotor 60, and disc 62) forward and toward the electronic card reader 80. Such forward movement is facilitated by the sliding movement of the sliding member 40 relative to the rail 42, and it results in the insertion of the electronic card 76 into the second slot 84 of the electronic card reader 80, as shown in FIG. 5. Again, activating the first servomotor 20 to rotate the drive wheel 22 in the opposite direction would withdraw the electronic card 76 from the second slot 84 of the electronic card reader.

Figure 6:
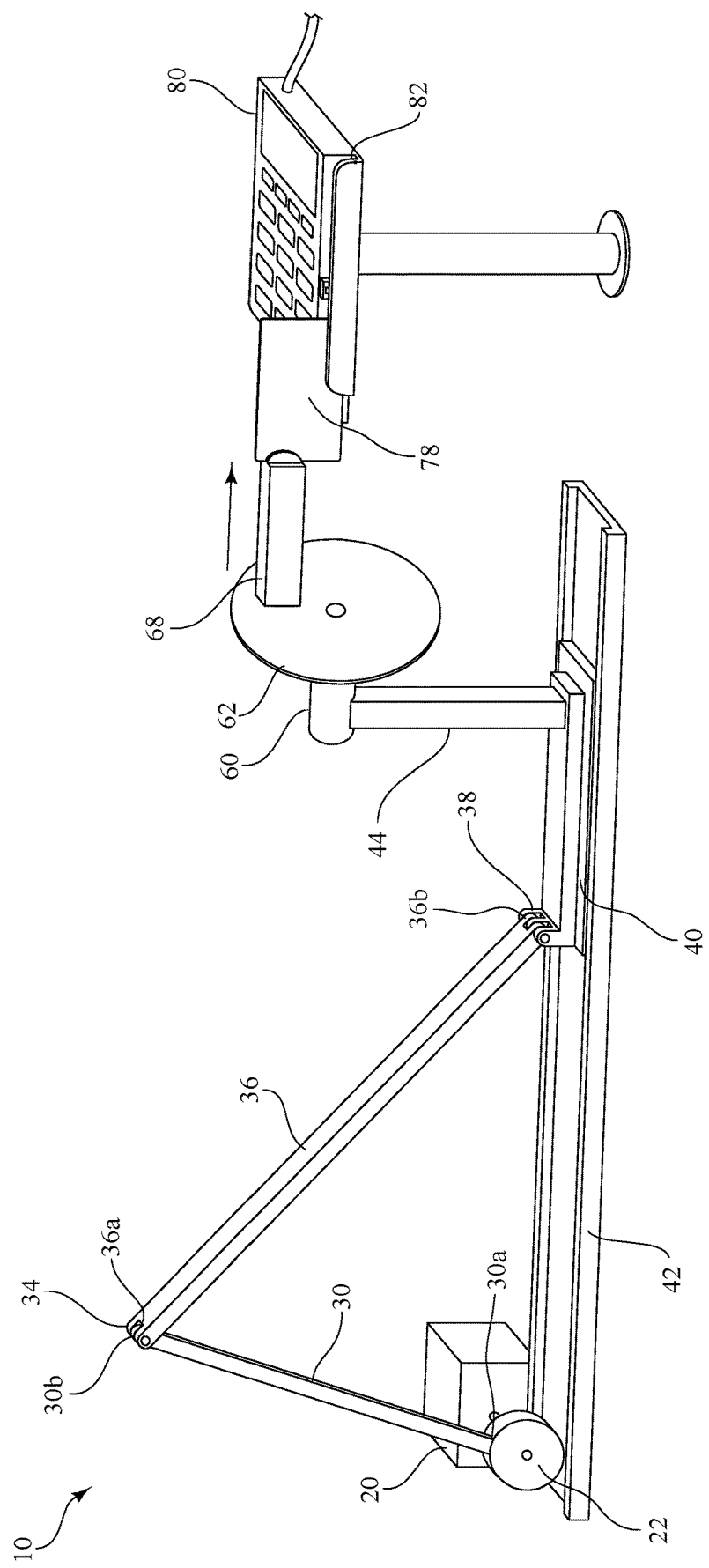
FIGS. 6 and 7 are perspective views similar to FIG. 1, illustrating the movement of the robot assembly to swipe an electronic card through another slot of an electronic card reader.

FIG. 6 is substantially identical to FIG. 1, except that, in this exemplary embodiment, a different form of mount 68 is secured to a face of the disc 62. This mount 68 is also configured to grasp or otherwise hold and secure an electronic card 78, but it extends further away from the face of the disc 62. In use, upon a receipt of an input signal, the microprocessor 102 of the control system 100 (FIG. 2) communicates a control signal to the second servomotor 60, which rotates the disc 62, such that the electronic card 78 is aligned with the first slot 82 of the electronic card reader 80. The control system 100 then communicates a control signal to the first servomotor 20, rotating the drive wheel 22. Such rotation of the drive wheel 22 (clockwise in FIG. 6) causes the first arm 30 to rotate, which causes the distal end 30b of the first arm 30 and the first hinge 34 to move downward. Thus, the proximal end 36a of the second arm 36 also moves downward, which advances the distal end 36b of the second arm 36 (along with the sliding member 40, upright support member 44, second servomotor 60, and disc 62) forward and toward the electronic card reader 80. Such forward movement is facilitated by the sliding movement of the sliding member 40 relative to the rail 42, and it results in the insertion of the electronic card 78 into the first slot 82 of the electronic card reader 80, as shown in FIG. 6. The control system 100 then communicates a control signal to the first servomotor 20, rotating the drive wheel 22 in the opposite direction, which would withdraw the electronic card 78 from the first slot 82 of the electronic card reader, thus replicating a swiping motion.

Figure 7:
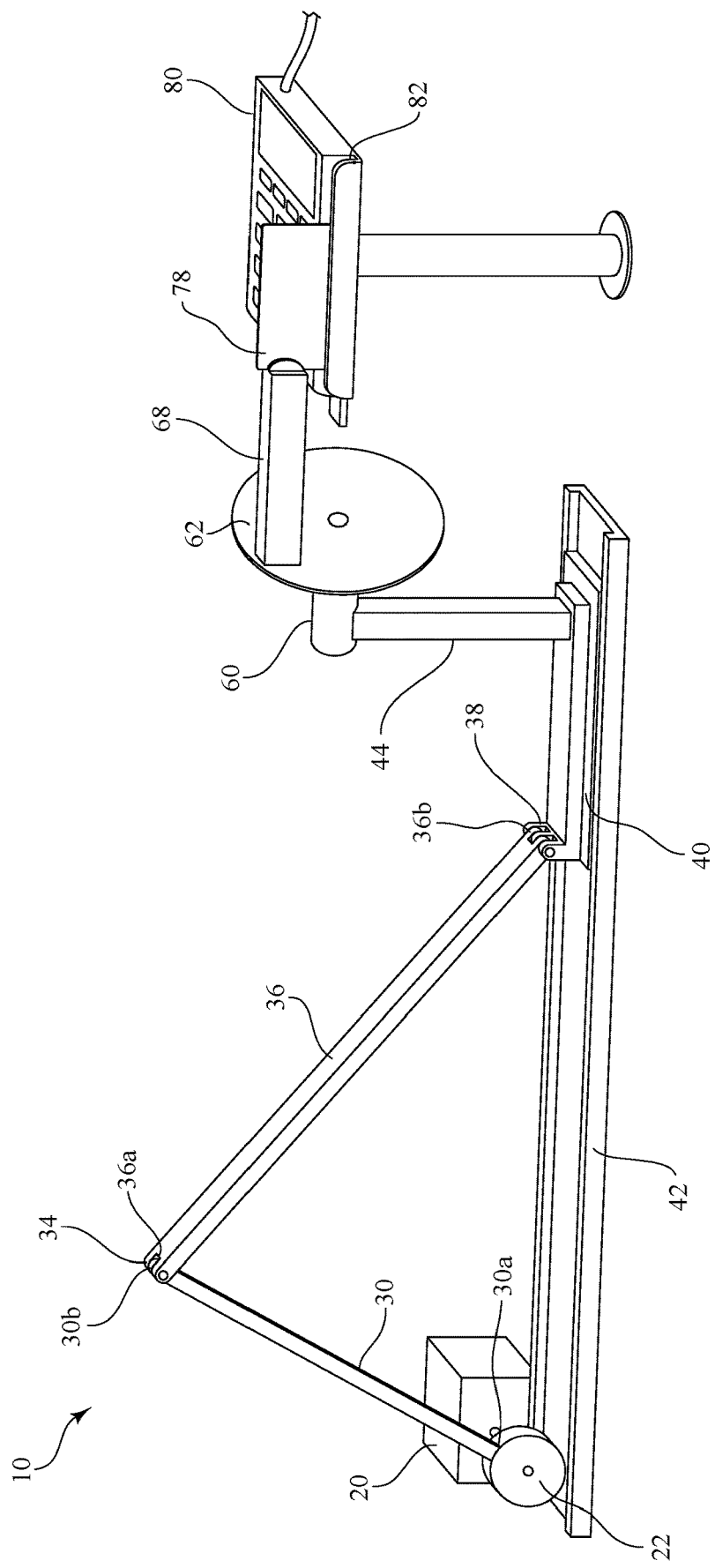

Of course, the mounts 64, 66 illustrated in FIGS. 3-5 and the mount 68 illustrated in FIGS. 6-7 could be combined and included on the same disc 62. Indeed, it would be preferred that the mounts on the disc 62 allow for selectively swiping one of the electronic cards through a first slot of the electronic card reader and for inserting (or "dipping") one of the electronic cards into the second slot of the electronic card reader (Showing the mounts 64, 66 separate and apart from the mount 68 was only for purposes of illustration.) Furthermore, other forms of mounts could be used to secure the electronic cards without departing from the spirit and scope of the present invention.

As described above, the robot assembly 10 and control system 100 described above are part of an exemplary electronic card reader testing system. The overall electronic card reader testing system may also include a computer program (i.e., computer-readable instructions stored in a memory component and executed by a processor of a computer) that operably connects the control system 100 of the robot assembly 10 to a point-of-sale (POS) system, thus further automating the testing protocol.

Figure 8:
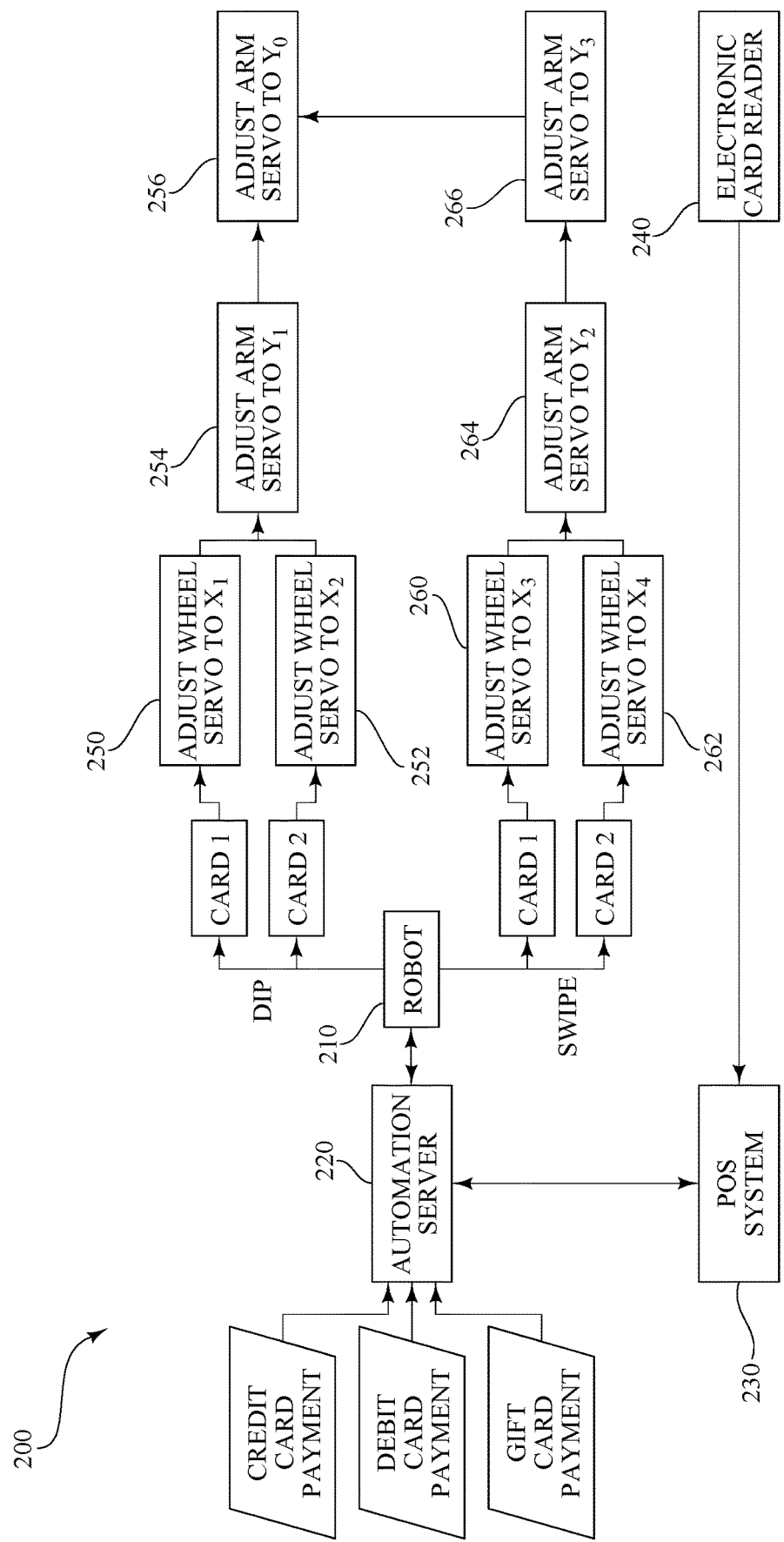
FIG. 8 is a schematic diagram of an exemplary electronic card reader testing system made in accordance with the present invention.

FIG. 8 is a schematic diagram of an exemplary electronic card reader testing system 200, in which the robot assembly 10 and control system 100 are collectively identified as a "robot" 210, and the software program is identified as an "automation server" 220. The automation server 220 operably connects the robot 210 and a POS system 230. Thus, as part of a testing protocol, the automation server 220 initiates a transaction that is communicated to both the robot 210 and the POS system 230. The transaction could be a credit card payment, a debit card payment, or a gift card payment. In response, as described above, the robot 210 can either selectively swipe a selected electronic card through a first slot of an electronic card reader 240 or insert a selected electronic card into a second slot of the electronic card reader 240. The automation server 220 communicates instructions to the robot 210 as to whether to swipe or dip, and which electronic card to use. The robot 210 carries out the instructions (in the manner described above with reference to FIGS. 1-8).

In one exemplary implementation, and as illustrated in FIG. 8, the robot 210 is initially in a home position (as shown, for example, in FIGS. 1 and 4). If the automation server 220 communicates instructions to the robot 210 to dip CARD1, the wheel servo (which is the second servomotor 60 described above with reference to FIGS. 1-7) is adjusted (rotated) to a first predetermined position, $X_1$, to align CARD1, as indicated by block 250 in FIG. 8. The arm servo (which is the first servomotor 20 described above with reference to FIGS. 1-7) is then adjusted (rotated) to a first predetermined position, $Y_1$, to dip CARD1 into a slot of the electronic card reader, as indicated by block 254 in FIG. 8. The arm servo is then returned to the home position, $Y_0$, withdrawing CARD1 from the electronic card reader, as indicated by block 256 in FIG. 8.

Referring still to FIG. 8, if the automation server 220 communicates instructions to the robot 210 to dip CARD2, the wheel servo is adjusted (rotated) to a second predetermined positioned, $X_2$, to align CARD2, as indicated by block 252 in FIG. 8. The arm servo is then adjusted (rotated) to the first predetermined position, $Y_1$, to dip CARD2 into a slot of the electronic card reader, as indicated by block 254 in FIG. 8. The arm servo is then returned to the home position, $Y_0$, withdrawing CARD2 from the electronic card reader, as indicated by block 256 in FIG. 8.

Referring still to FIG. 8, if the automation server 220 communicates instructions to the robot 210 to swipe CARD1, the wheel servo (which is the second servomotor 60 described above with reference to FIGS. 1-7) is adjusted (rotated) to a third predetermined position, $X_3$, to align CARD1, as indicated by block 260 in FIG. 8. The arm servo (which is the first servomotor 20 described above with reference to FIGS. 1-7) is then adjusted (rotated) to a second predetermined position, $Y_2$, to advance CARD1 into a slot of the electronic card reader, as indicated by block 264 in FIG. 8. The arm servo (which is the first servomotor 20 described above with reference to FIGS. 1-7) is then adjusted (rotated) to a third predetermined position, $Y_3$, to advance CARD1 through the slot of the electronic card reader, as indicated by block 266 in FIG. 8. The arm servo is then returned to the home position, $Y_0$, swiping CARD1 back though the slot and withdrawing CARD1 from the electronic card reader, as indicated by block 256 in FIG. 8.

Referring still to FIG. 8, if the automation server 220 communicates instructions to the robot 210 to swipe CARD2, the wheel servo is adjusted (rotated) to a fourth predetermined position, $X_4$, to align CARD2, as indicated by block 262 in FIG. 8. The arm servo is then adjusted (rotated) to the second predetermined position, $Y_2$, to advance CARD1 into a slot of the electronic card reader, as indicated by block 264 in FIG. 8. The arm servo is then adjusted (rotated) to the third predetermined position, $Y_3$, to advance CARD2 through the slot of the electronic card reader, as indicated by block 266 in FIG. 8. The arm servo is then returned to the home position, $Y_0$, swiping CARD2 back though the slot and withdrawing CARD2 from the electronic card reader, as indicated by block 256 in FIG. 8.

Once the selected electronic card—CARD1 or CARD2—has been dipped or swiped, the electronic card reader 240 captures the relevant information and reports back to the POS system 230 (in the same manner as any routine transaction processed by the electronic card reader 240). The POS system 230 then communicates whether the transaction was successful to the automation server 220. The automation server 220 then communicates additional instructions to the robot 210, so that various electronic cards can be swiped or dipped, verifying that the electronic card reader 240 and the POS system 230 are functioning properly. In this regard, each transaction and the associated swiping or dipping action could be independently initiated by a user input received by the automation server 220. Alternatively, a sequence of transactions could be stored in a memory component as a programmed sequence of transactions that comprise a particular testing protocol.

The necessary computer-readable instructions for operation of the computer program (or automation server 220) can be coded into a computer-readable form using standard programming techniques and languages, and with the benefit of the above description, such programming is readily accomplished by a person of ordinary skill in the art.

Referring again to FIG. 8, in this exemplary embodiment, it is contemplated that two electronic cards ("CARD1" and "CARD2") are mounted to and supported by the robot 210, and each of these two electronic cards can be swiped or dipped. Of course, however, it is contemplated that different numbers of electronic cards could be mounted to and supported by the robot 210 without departing from the spirit and scope of the present invention.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A testing system for an electronic card reader, comprising:

a robot assembly for manipulating one or more electronic cards and including
  a first servomotor operably connected to a drive wheel,
  a first arm connected to and extending from the drive wheel,
  a second arm connected to a distal end of the first arm via a first hinge,
  a sliding member connected to a distal end of the second arm via a second hinge, wherein the sliding member is configured for lateral movement relative to a rail,
  an upright support member mounted on the sliding member,
  a second servomotor mounted to the upright support member, wherein the second servomotor is operably connected to and rotates a disc, and
  one or more mounts secured to a face of the disc, with each of the one or more mounts configured to hold and secure one of the one or more electronic cards,
  wherein, in use, rotation of the second servomotor causes rotation of the disc to align a selected one of the one or more electronic cards with either the first slot or the second slot of the electronic card reader, and
  wherein rotation of the first servomotor in a first direction results in movement of the disc toward the electronic card reader; and
a control system operably connected to and communicating control signals to the robot assembly for (i) swiping a selected one of the one or more electronic cards through a first slot of the electronic card reader, and (ii) inserting a selected one of the one or more electronic cards into a second slot of the electronic card reader.

2. The testing system as recited in claim 1, and further comprising a computer program operably connecting the control system with a point-of-sale (POS) system.

3. The testing system as recited in claim 1, wherein rotation of the first servomotor in a second direction results in movement of the disc away from the electronic card reader.

4. A testing system for an electronic card reader, comprising:
  a robot assembly, including
    a disc with multiple mounts secured to a face of the disc, with each of the multiple mounts configured to hold and secure an electronic card,
    a means for rotating the disc to align a selected electronic card with a selected slot of the electronic card reader, and
    a means for moving the disc toward and away from the electronic card reader.

5. The testing system as recited in claim 4, and further comprising a control system operably connected to and communicating control signals to the robot assembly for aligning the selected electronic card with the selected slot of the electronic card reader, and then advancing the selected electronic card into the selected slot of the electronic card reader.

6. The testing system as recited in claim 5, and further comprising a computer program operably connecting the control system with a point-of-sale (POS) system.

7. The testing system of claim 4, wherein the multiple mounts include:
  a first subset of one or more mounts each configured for inserting an electronic card into a first slot of the electronic card readers in a dipping action; and
  a second subset of one or more mounts each configured for inserting an electronic card into a second slot of the electronic card readers in a swiping action.

8. A testing system for an electronic card reader, comprising:
  a robot assembly for manipulating one or more electronic cards, including
    a first servomotor operably connected to a drive wheel,
    a first arm connected to and extending from the drive wheel,
    a second arm connected to a distal end of the first arm via a first hinge,
    a sliding member connected to a distal end of the second arm via a second hinge, wherein the sliding member is configured for lateral movement relative to a rail,
    an upright support member mounted on the sliding member,
    a second servomotor mounted to the upright support member, wherein the second servomotor is operably connected to and rotates a disc, and
    one or more mounts secured to a face of the disc, with each of the one or more mounts configured to hold and secure one of the one or more electronic cards; and
  a control system operably connected to and communicating control signals to the robot assembly to (i) actuate the second servomotor and rotate the disc to align a selected one of the one or more electronic cards with either a first slot or a second slot of the electronic card reader, and (ii) actuate the first servomotor in a first direction to advance the disc toward the electronic card reader.

9. The testing system as recited in claim 8, and further comprising a computer program operably connecting the control system with a point-of-sale (POS) system.

* * * * *